United States Patent [19]
Ruf

[11] 3,905,730
[45] Sept. 16, 1975

[54] INTERIOR SEAL FOR THE PISTON OF A ROTARY PISTON ENGINE

[75] Inventor: Max Ruf, Obereisenheim, Germany

[73] Assignees: Audi Nsu Auto Union Aktiengesellschaft; Wankel G.m.b.H., Germany

[22] Filed: Jan. 29, 1974

[21] Appl. No.: 437,659

[30] Foreign Application Priority Data
Feb. 3, 1973 Germany............................ 2305445

[52] U.S. Cl. .............................................. 418/142
[51] Int. Cl.² .................... F01C 19/00; F01C 19/08
[58] Field of Search................... 418/140, 142, 139; 277/140, 141

[56] References Cited
UNITED STATES PATENTS

| | | | |
|---|---|---|---|
| 2,827,349 | 3/1958 | Burns..................... | 277/140 |
| 3,535,061 | 10/1970 | Yamamoto.................. | 418/142 |
| 3,601,415 | 8/1971 | Bond...................... | 277/140 |

FOREIGN PATENTS OR APPLICATIONS

| | | | |
|---|---|---|---|
| 942,179 | 11/1963 | United Kingdom........... | 418/142 |
| 1,175,505 | 8/1964 | Germany.................. | 418/142 |

Primary Examiner—William L. Freeh
Assistant Examiner—L. T. Casaregola
Attorney, Agent, or Firm—Kane, Dalsimer, Kane, Sullivan and Kurucz

[57] ABSTRACT

An interior seal for the piston of a rotary piston engine of trochoid construction includes at least two metal scraper rings each immediately superimposed radially and arranged to be axially movable together in an annular groove in one face of the piston under spring pressure against the neighboring end wall of the housing.

3 Claims, 6 Drawing Figures

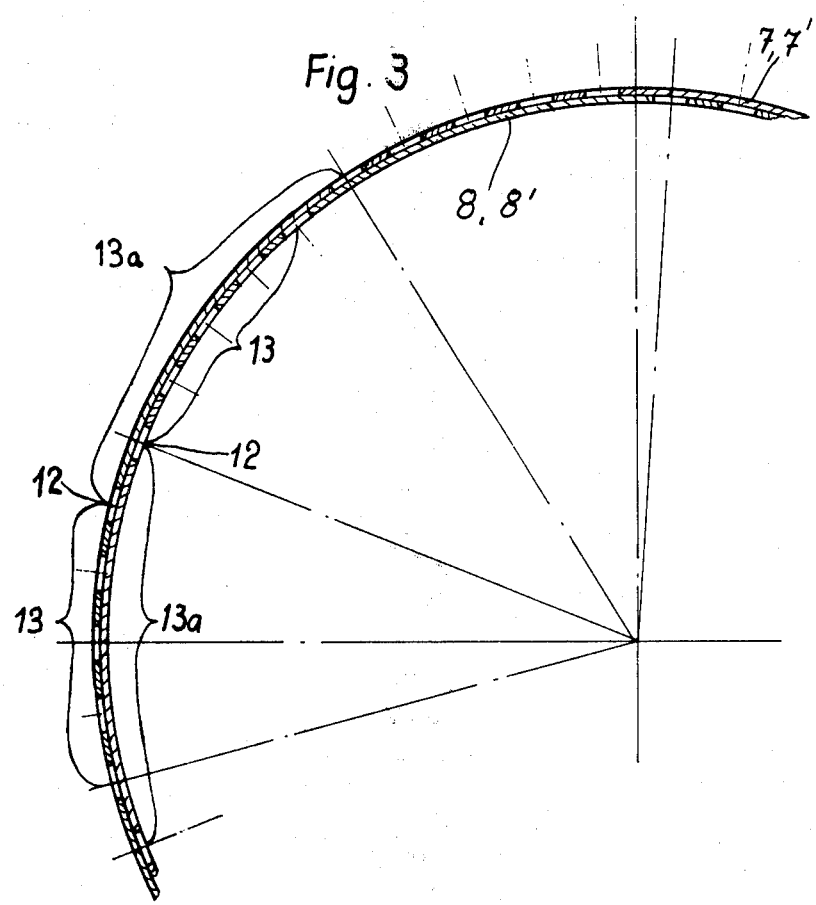

INTERIOR SEAL FOR THE PISTON OF A ROTARY PISTON ENGINE

BACKGROUND OF INVENTION

In a known interior seal, the scraper rings are not elastic enough to afford a secure seal against a groove wall. Supplementary elastomer sealing rings are generally required, but their lifetime or durability is limited.

SUMMARY OF INVENTION

The object of the invention is to provide a dependable interior seal that will cooperate with a wall of an annular groove without the aid of an elastomeric seal.

According to the invention, the scraper rings have recesses alternately arranged in an axial direction, and are so superimposed and secured against rotation, that the recesses of one scraper ring are staggered in relation to other scraper rings.

The interior seal may consist of two superimposed annularly closed steel hoops, having recesses which may be arrowhead-shaped. A sealing contact with the radially inner or outer wall of the groove is achieved by elastic deformation because of these recesses. The seal against the end wall of the housing is afforded by the staggered arrangement of the recesses. The tight radial contact of the interior seal with one wall of the groove involves a comparatively slight pressure, so that the requisite axial mobility of the interior seal is not impaired.

Advantageously an increase in the elasticity of the scraper rings can also be achieved by distributing the recesses of each scraper ring segment-wise over equal sectors in staggered relationship to the corresponding sectors of the other scraper ring. In this manner the sectors of one scraper ring are covered by unrecessed sectors of the other scraper ring. By thus dividing the recesses into sectors, the spacing of the several recesses may be kept closer, so that the resulting narrower webs of material of the scraper rings achieve a softer spring action in a circumferential direction.

In order to improve the seal against leakage of coolant or lubricant into the working chambers, two scraper rings may be provided in two concentric annular grooves in each face of the piston.

The invention further contemplates arranging a U-shaped spring supporting ring between associated pairs of scraper rings in an annular groove. This supporting ring presses the pairs of scraper rings radially apart against the walls of the annular groove. This is accomplished by directing two flanges of the supporting ring axially to the base of the annular groove, and the ends of these flanges are radially bent, accommodating the scraper rings of the several pairs alternately at their ends pointing towards the base of the groove and supporting them in axial direction. Owing to the alternate accommodation of the scraper rings in the supporting ring, each scraper ring is capable of being individually pressed against the end wall of the housing in an axial direction to equalize any dimensional discrepancies that may occur within the arrangement or in case of unevenness in the end part of the housing. For this purpose the scraper rings is provided with apertures correspondingly worked in alternately on their inner face directed at the base of the annular groove.

Alternatively, a conventional corrugated spring ring may be employed to press the proposed U-shaped supporting ring axially against the neighboring end wall of the housing. Because of the available clearance between the base of the annular groove and the supporting ring, the spring may have a relatively long spring travel and be capable of exerting relatively soft or low spring forces especially suitable for this purpose.

In order to exert the spring action required for pressure into contact with the end wall of the housing, it may also be of advantage to arrange a circular helical spring ring acting in an axial direction to the end wall between the U-shaped supporting ring and the base of the annular groove. In such an embodiment, the turns of the spring are acted upon transverse to the axis of winding, and owing to the approximately lineal contact of the lateral flanks of the helical spring ring, there can be a uniform transmission of spring action from the base of the annular groove through the supporting ring and so on to the scraper rings.

BRIEF DESCRIPTION OF THE DRAWINGS

FIG. 3 shows an end view of the interior seal employed in FIG. 1;

DETAILED DESCRIPTION OF THE PREFERRED EMBODIMENT

Figure 1:
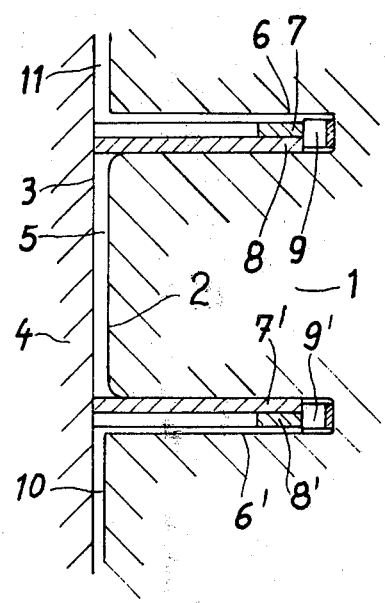
FIG. 1 of the drawing shows a section of a piston end wall and an interior seal according to the invention.

Reference will first be made to FIG. 1, in which 1 designates a piston end wall whose face 2 together with the end wall 3 of the adjoining end part 4 of the housing bounds an annular space 5. In the end wall 1 of the piston, annular grooves 6 and 6' are provided in each of which is inserted an axially movable interior seal composed of scraper rings 7, 8 and 7', 8' immediately superimposed in pairs and having a thickness of material of about 1 mm. The scraper rings 7, 8 and 7', 8' are in sealing contact with one wall of the annular grooves 6, 6' and are pressed against the end wall 3 of the housing by a corrugated spring 9, to prevent passage of coolant or lubricant from the cavity 10 radially into the annular space 5 and thence into the working chamber 11.

Figure 2:
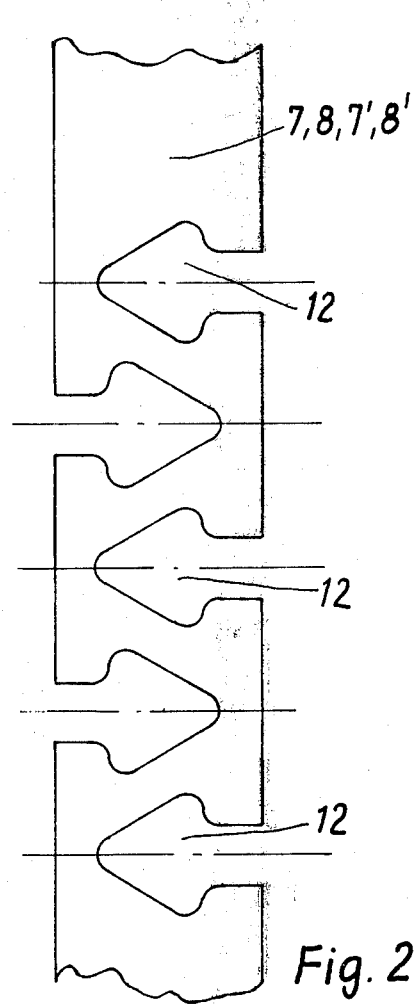
FIG. 2 shows a partial view of a scraper ring of the interior seal of FIG. 1.

FIG. 2 shows a single scraper ring 7, 8, or 7', 8' in radial elevation, having recesses 12 arranged alternately in an axial direction to achieve an operative elasticity in circumferential direction. These recesses are, for example, arrowhead-shaped, but may alternatively be mushroom or funnel-shaped or, again, quadrangular.

FIG. 3 shows pairs of scraper rings 7, 8, or 7', 8' with recesses 12 extending over sectors 13. These rings are secured against rotation and so arranged that the sectors are covered by unrecessed regions 13a of the other scraper ring to prevent coolant or lubricant losses.

Figure 4:
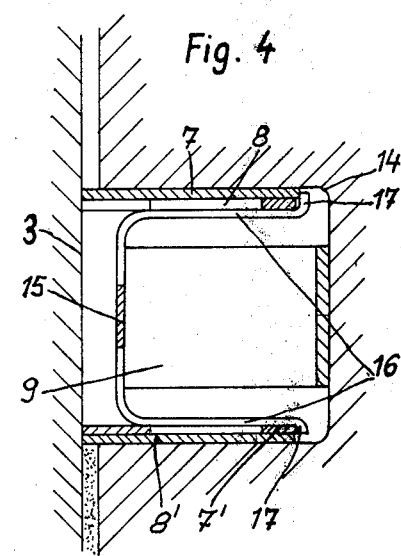
FIG. 4 shows a section similar to FIG. 1 with an interior seal according to a second embodiment.

In FIG. 4 the same references are used for like or similar parts as in FIG. 1. In departure, however, from the embodiment of FIG. 1, the associated pairs of scraper rings 7, 8 and 7', 8' are held within one annular groove 14 radially in contact with the walls of groove 14 by the two flanges 16 of a U-shaped spring supporting ring 15.

The two bent ends 17 of the flanges support the scraper rings 7, 8 and 7' 8' in an axial direction against the end wall 3 of the housing. The axially acting spring load is exerted by a corrugated spring ring 9.

Figure 5:
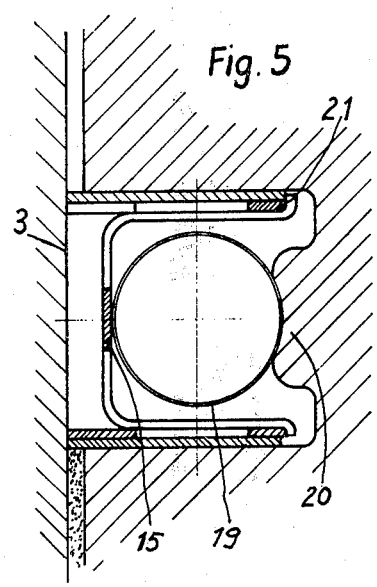
FIG. 5 shows a section similar to FIG. 4 with an interior seal held in contact by means of a modified spring.

Instead of the corrugated spring ring, a helical spring ring 19 shown in FIG. 5 may be employed for contact pressure in an axial direction against the end wall 3 of the housing. The spring ring 19 fits on one side into a trough 20 in the floor of the annular groove and on the other side axially against the inside of the supporting ring 15.

Figure 6:
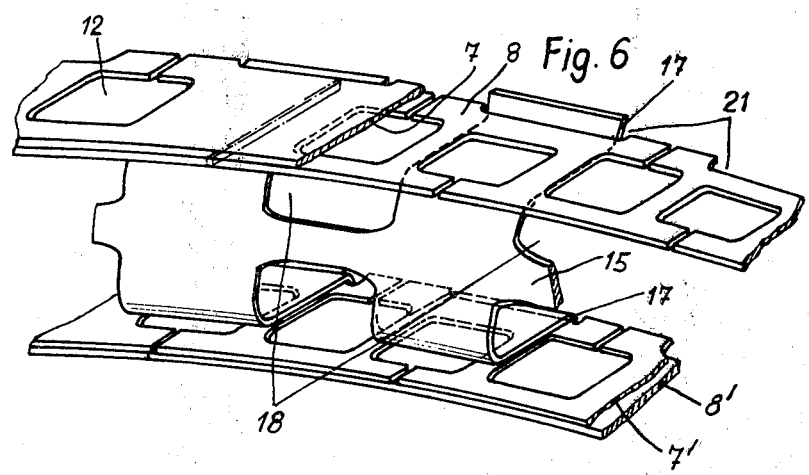
FIG. 6 shows a partial view in perspective of the interior seal employed in FIGS. 4 and 5.

In FIG. 6 the U-shaped supporting ring 15 is provided with apertures and recesses 18 to increase its elasticity. In order to obtain elasticity in an axial direction against the end wall 3 of the housing the flange ends 17 are alternately extended and reduced to thereby accommodate in alternate fashion the scraper rings 7, 8, and 7' 8'. Towards this end the flanges are disposed in recesses 21 in scraper rings 7, 8, and 7' 8'.

Thus the several aforenoted objects and advantages are most effectively attained. Although several somewhat preferred embodiments have been disclosed and described in detail herein, it should be understood that this invention is in no sense limited thereby and its scope is to be determined by that of the appended claims.

I claim:

1. An interior seal for the piston of a rotary piston engine of trochoid construction comprising: a housing and a piston having an annular groove in one face thereof, the housing having an end wall adjacent the groove, a spring ring, at least two metal scraper rings each immediately superimposed radially and are arranged axially movable together in the annular groove in one face of the piston and pressed against the adjacent end wall of the housing by the spring ring, scraper rings having recesses arranged alternately in axial direction and are so superimposed and secured against rotation that the recesses of one scraper ring are staggered in relation to the other scraper ring, the recesses of each scraper ring being distributed segment-wise over equal sectors arranged in staggered relation to the corresponding sectors of the other scraper ring, so that the sectors of one scraper ring are covered by unrecessed sectors of the other scraper ring thereby permitting the recesses in each ring to be arranged very close to each other thereby improving the flexibility of that sector of the ring and insuring a very good contact with the adjacent end wall of the housing.

2. An interior seal according to claim 1, wherein two scraper rings each are arranged in two concentric annular grooves in the face of the piston.

3. An interior seal for the piston of a rotary piston engine of trochoid construction comprising: a housing and a piston having an annular groove in one face thereof, the housing having an end wall adjacent the groove, a spring ring, at least two metal scraper rings each immediately superimposed radially and are arranged axially movable together in the annular groove in one face of the piston and pressed against the adjacent end wall of the housing by the spring ring, scraper rings having recesses arranged alternately in axial direction and are so superimposed and secured against rotation that the recesses of one scraper ring are staggered in relation to the other scraper ring, a U-shaped spring supporting ring being arranged between the scraper rings, scraper rings being associated in pairs in an annular groove, the supporting ring having two flanges directed axially to the base of the annular groove and pressing the pair of scraper rings each radially apart against the walls of the annular groove, and the ends of the flanges being bent back radially, and alternately accommodating the scraper rings by their faces pointing at the base of the annular groove and supporting them in axial direction, a spring ring being disposed between the U-shaped supporting ring and the base of the annular groove and acting in an axial direction to the end wall of the housing, and the ends of the flanges of the U-shaped spring supporting ring which are bent back radially having longer and shorter sections with the shorter sections abutting only the inner scraper rings and the longer sections abutting only the outer scraper rings.

* * * * *